United States Patent [19]

Oates et al.

[11] 4,239,595
[45] Dec. 16, 1980

[54] DATA SYSTEM FOR AUTOMATIC FLUX MAPPING APPLICATIONS

[75] Inventors: Robert M. Oates, Murrysville; James A. Neuner, Rich Land, both of Pa.; Robert D. Couch, Jr., Baltimore; Alan M. Kasinoff, Pikesville, both of Md.

[73] Assignee: Westinghouse Electric Corp., Pittsburgh, Pa.

[21] Appl. No.: 2,630

[22] Filed: Jan. 11, 1979

[51] Int. Cl.³ .............................................. G21C 17/00
[52] U.S. Cl. .................................. 176/19 R; 176/20 R
[58] Field of Search ............... 176/19 R, 19 J, 19 EC, 176/20, 22, 24

[56] References Cited

U.S. PATENT DOCUMENTS

| | | | |
|---|---|---|---|
| 3,654,607 | 4/1972 | Wavre et al. | 176/22 |
| 3,654,608 | 4/1972 | Wavre | 176/22 |
| 3,858,191 | 12/1974 | Neuner et al. | 176/19 EC |
| 3,888,772 | 6/1975 | Neuner | 176/20 |
| 3,932,211 | 1/1976 | Loving, Jr. | 176/19 R |
| 4,045,282 | 8/1977 | Barbier | 176/19 R |
| 4,105,496 | 8/1978 | Therowd | 176/19 R |

*Primary Examiner*—S. A. Cangialosi
*Attorney, Agent, or Firm*—M. P. Lynch

[57] ABSTRACT

In an automatic flux mapping system utilizing a microprocessor for control and data information processing, signals from the in-core detectors providing the flux mapping operation are converted to a frequency link and are made available to the microprocessor via a programmable timer thus minimizing the participation of the microprocessor so that the microprocessor can be made more available to satisfy other tasks.

9 Claims, 3 Drawing Figures

DATA SYSTEM FOR AUTOMATIC FLUX MAPPING APPLICATIONS

BACKGROUND OF THE INVENTION

In commercial nuclear reactors, it is necessary to periodically monitor the axial flux distribution as directly as possible throughout the core in order to perform proper fuel management as well as to monitor other conditions. The task has traditionally been formed by a movable in-core flux mapping system requiring substantial operator interaction for control and data reduction.

There is disclosed in detail in copending patent applications Ser. No. 950,650 filed Oct. 12, 1978, and Ser. No. 950,651, filed Oct. 12, 1978, which are assigned to the assignee of the present invention incorporated herein by reference, flux mapping systems employing microprocessor circuits and related memory, to position the in-core detectors and develop a flux map on the basis of the data generated by the detectors.

SUMMARY OF THE INVENTION

There is disclosed herein with reference to the accompanying drawings interface circuitry for coupling the data from the detectors to the microprocessor which minimizes the microprocessor time required to accept data thus providing sufficient microprocessor time to perform other system and control functions. The disclosed collection interface circuitry provides a technique for measuring variable frequency data from the in-core detectors with a minimum amount of hardware and with crystal controlled accuracy.

A frequency link is employed to transmit data with good isolation and the information is measured using a single programmable timer to make the most effective use of the microprocessor.

DESCRIPTION OF THE DRAWINGS

The invention will become more readily apparent from the following exemplary description in connection with the accompanying drawings.

DESCRIPTION OF THE PREFERRED EMBODIMENT

An automatic flux mapping system consists of a control counsel and a detector drive system. A typical detector drive system consists of several drive units, ach of which has a movable detector connected to a flexible cable. Associated with each drive unit are rotary transfer mechanisms and a number of thimbles, or hollow tubes, which protrude into the reactor core. The rotary transfer mechanisms function as mechanical multiplexers and make it possible to probe any of the core paths of the reactor core with any of the detectors. While the details of the detectors and respective drive units are not illustrated herein, the operation of the detectors is described and illustrated in U.S. Pat. No. 3,858,191, entitled "Digital Multiplexed Position Indication and Transmission System", issued Dec. 31, 1974, assigned to the assignee of the present invention and incorporated herein by reference. Similarly, U.S. Pat. No. 3,932,211, issued Jan. 13, 1976, entitled "Method of Automatically Monitoring the Power Distribution of a Nuclear Reactor Employing Movable In-Core Detectors", and assigned to the assignee of the present invention is incorporated herein by reference. As described in the above-referenced U.S. Pat. No. 3,932,211, the detectors are inserted into the reactor core during normal power operation according to a predetermined, intermittent, time program. Upon insertion, the detectors are automatically driven through the core region along fixed predetermined paths. The outputs of the detectors are recorded as a function of core location to provide a representation of the reactor power distribution.

Figure 1:
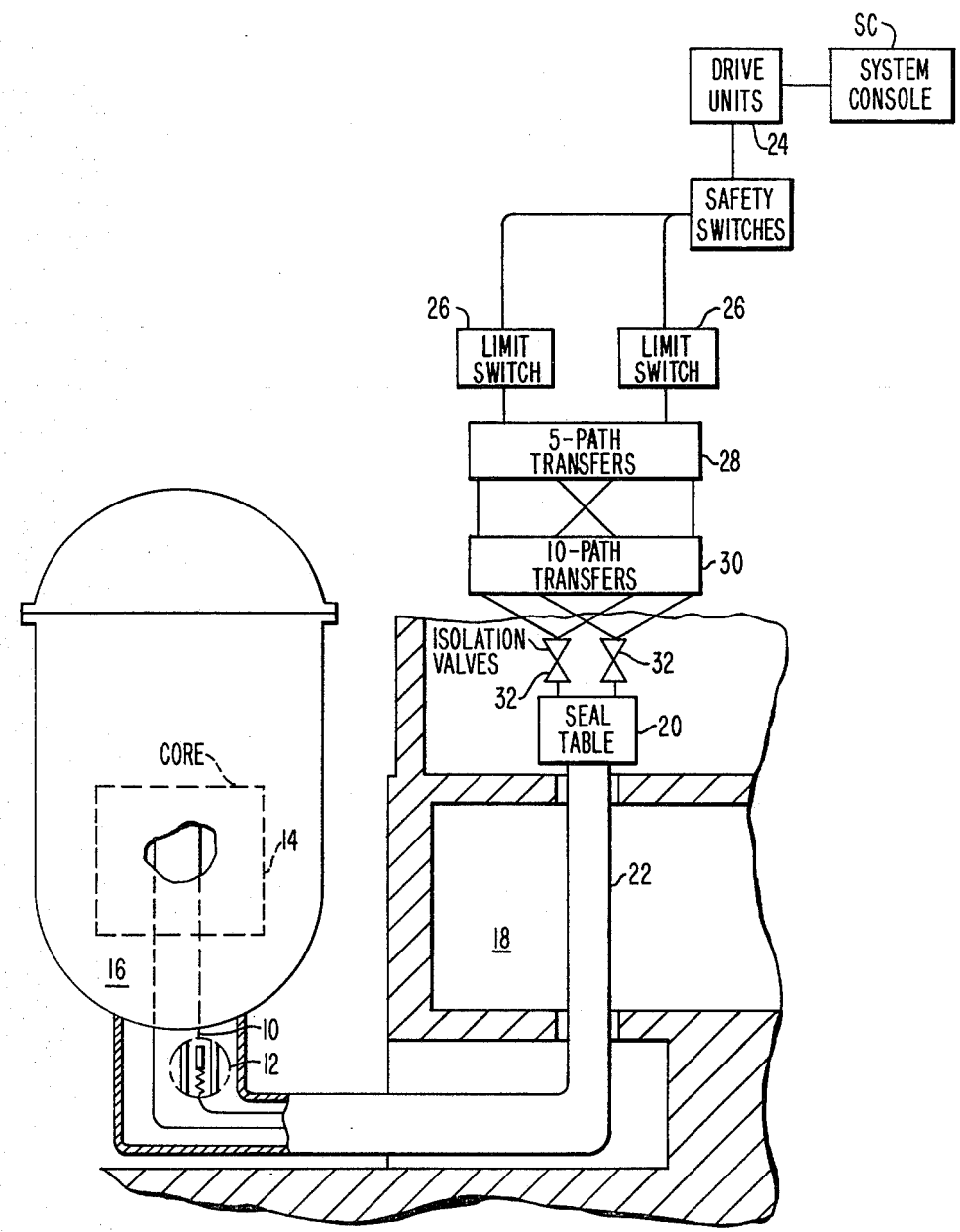
FIG. 1 is a perspective view illustrating a basic flux mapping system.

FIG. 1 shows a basic system for the insertion of the movable miniature detectors, i.e., movable in-core neutron detectors. Retractable thimbles 10, into which the miniature detectors 12 are driven, take the route approximately as shown. The thimbles are inserted into the reactor core 14 through conduits extending from the bottom of the reactor vessel through the concrete shield 18 and then up to a thimble seal table 20. Since the movable detector thimbles are closed at the leading (reactor) end they are dry inside. The thimbles thus serve as a pressure barrier between the reactor water pressure, i.e., 2500 psig, and the atmosphere. Mechanical seals between the retractable thimbles and the conduits are provided at the seal tables 20. The conduits 22 are essentially extensions of the reactor vessel 16, with the thimbles allowing the insertion of the in-core instrumentation movable miniature detectors. During operation, the thimbles 10 are stationary and will be retracted only under deep pressurized conditions during refueling or maintenance operations. Withdrawal of the thimble to the bottom of the reactor vessel is also possible if work is required on the vessel internals.

The drive system for the insertion of each miniature detector includes basically a drive unit 24, limit switch assemblies 26, a five-path rotary transfer mechanism 28, a ten-path rotary transfer mechanism 30, and isolation valves 32 as illustrated in FIG. 1.

Each drive unit pushes a hollow helical rap drive cable into the core with a miniature detector attached to the leading end of the cable and a small diameter coaxial cable, which communicates the detector output, threaded through the hollow center back to the trailing end of the drive cable.

As a set of detectors enter the core, output electronics are initiated and continue monitoring the detectors' performance through the entire flux scan of that set. The function of the automatic flux mapping system counsel SC is to automatically probe all of the required core paths, record the measurements or readings from the detectors, and present this information to the system operator and plant computer.

In conventional semi-automatic flux mapping systems the neutron activity detectors are inserted at a constant speed into the core thimbles. The detector signal information is then amplified and recorded on a strip chart device, which also operates at a constant speed. The result is an analog trace which approximates the core activity as a function of the axial position of the detector. The analog data must then be digitized by the operator. Since the detector information is conventionally measured as a function of time rather than position, the plant computer associated with the flux mapping system must scan the numerous in-core detectors in real time, thus placing an undesirable demand on the available operating time of the plant computer.

Figure 2:
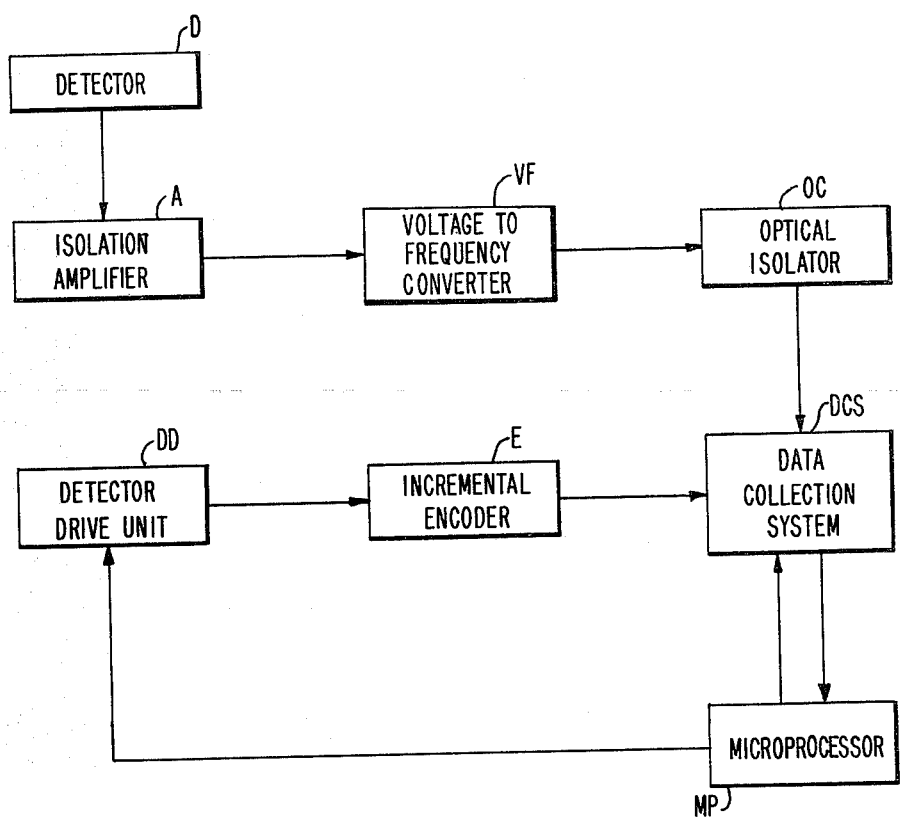
FIG. 2 is a functional block diagram of a data collection scheme employed in a flux measuring system.

The overall data measuring and control function associated with the flux mapping system is functionally illustrated in FIG. 2. The low level detector signal from an in-core detector D is amplified by isolation amplifier A and supplied to a voltage to frequency converter circuit VF to convert the output signal of the detector D to frequency pulses. The output of the voltage to frequency converter VF is coupled to a data collection system DCS by an optical isolator circuit IC. In addition to the detector data in the form of a frequency link being supplied to the data collection system DCS a second input to the data collection system DCS from the encoder circuit E corresponds to the drive position of the detector D as derived from the drive unit 24 associated with the detector D. The drive position information transmitted to the data collection system DCS by the incremental encoder E is in the form of a pair of quadrature square waves. The microprocessor circuit MP communicates with the data collection system DCS and provides the control information to the detector drive unit DD.

Figure 3:
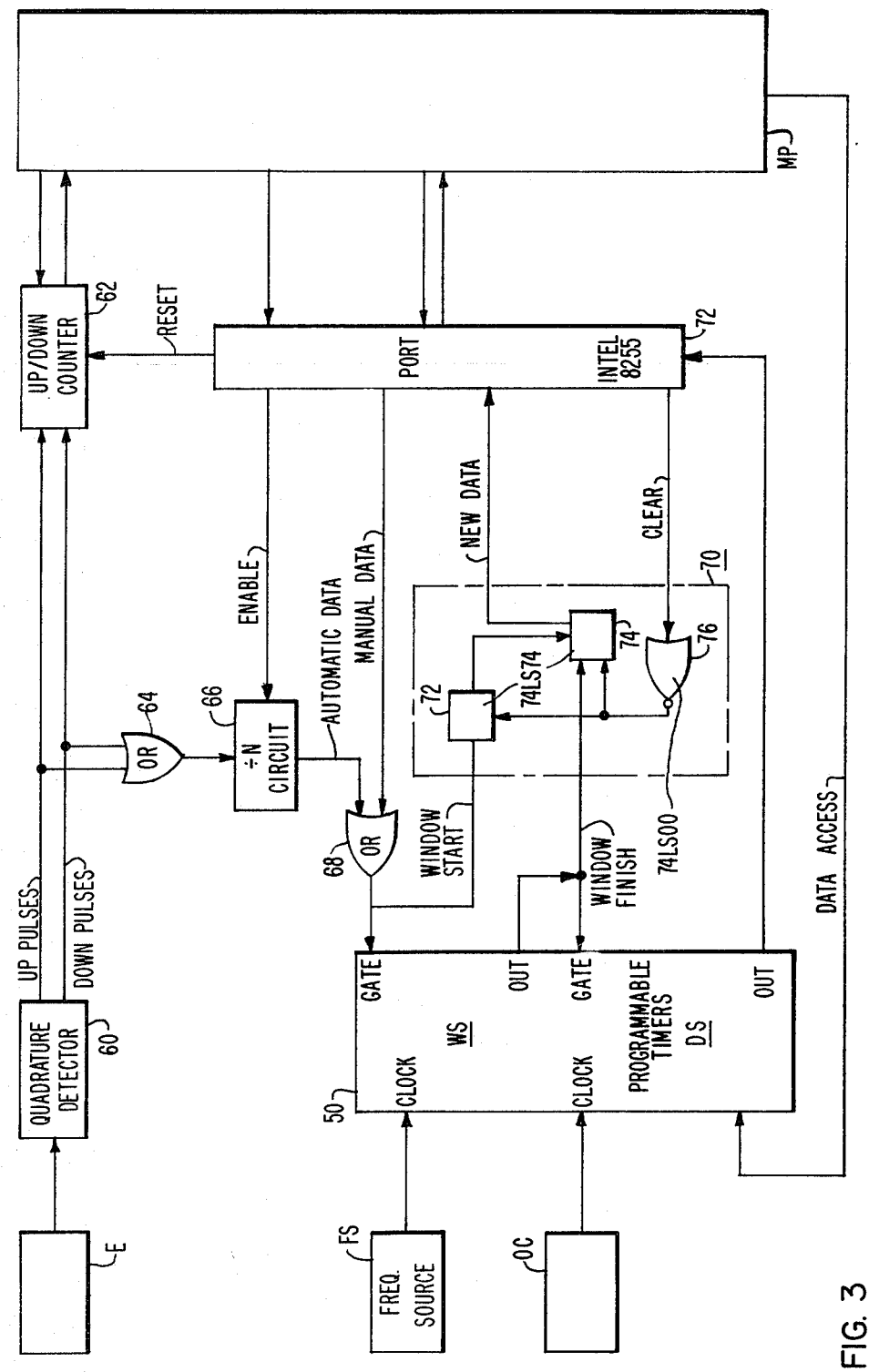
FIG. 3 is a block diagram illustration of a data collection system in accordance with the invention for use in the overall system of FIG. 2.

An implementation of the data collection system DCS in cooperation with the microprocessor circuit MP is illustrated in the block diagram of FIG. 3. A single programmable timer 50 is employed to produce a data window and to accurately count the frequency pulses developed by said voltage to frequency converter VF of FIG. 2 during the data window. Suitable implementation of the timer 50 can be realized through commercially available Intel Timer 8253. While this commercially available timer includes three sections each having a separate clock and gate input as well as a separate output, the implementation of the circuit of FIG. 3 employs only two of the three timer sections. An accurate reference frequency from a crystal controlled frequency source FS is supplied as a clock input to a window section WS of the programmable timer 50. Using the window section WS in a "one shot" mode, the window section WS develops output signals indicative of the beginning and end of a data window. Preferably the data window is established to be a multiple of the period of the power line excitation for the system thereby minimizing the effect of noise occurring on the power line. The data window limits established in the window section WS are supplied to the gate input of the data section DS of the programmable timer 50.

The data section of the programmable timer 50 is operated in an event counter mode to count the frequency pulse input information transmitted by the optical isolator circuit IC of FIG. 2 during the data window established by the window section WS.

Before the data window is initiated and the frequency pulse count begins, the counter stage of the data section DS is set to its maximum binary value, namely, all ones, such that the counter counts down during the data window. After the data window is closed by a window finish signal from the window section WS, the count is retained by the data section DS for access by the microprocessor MP. The count value present in the data section DS is subtracted from the initial maximum count value to obtain the count value corresponding to the frequency pulse information developed by the voltage to frequency converter VF and supplied to the timer 50 via the optical isolator circuit IC. Inasmuch as the initial count value was a maximum binary value of all ones, the measurement information of the detector D can be determined by simply taking the ones complement of the count value stored in the data section DS.

The microprocessor MP need not receive and process the detector D information in real time but rather may access the stored count information of the data section DS at anytime between data windows. This frees the microprocessor MP to monitor the output of numerous detectors and perform other functions.

The quadrature square waves from the incremental encoder E of FIG. 2 are supplied to a quadrature detector circuit 60 of FIG. 3. The quadrature detector circuit 60 responds to the square wave inputs by generating up and down pulses corresponding to the direction of movement of the detector drive DD of FIG. 2. An up/down counter 62 accumulates the pulse output of the quadrature detector 60 to provide a stored count indication of the position of the detector D to the microprocessor MP on demand. Since the encoder signals are incremental it is necessary to provide means to properly register the absolute position of the detector D. For this reason a limit switch 26 closing is made available to the microprocessor MP. Registration may be obtained by moving the detector drive DD until the switch 26 closes and then resetting the counter 62.

The up and down pulse output of the quadrature detector 60 is also gated through OR gate 64 to a divide-by-N circuit 66 wherein N corresponds to the desired spacing between data points which correspond to the beginning and end of the data window. Thus at the conclusion of every Nth pulse the output of the divide-by-N circuit 66 is gated through OR gate 68 to establish the data window start signal which is supplied to the gate input of the window section WS of the timer 50.

A microprocessor interface circuit, or port, 72, which can be implemented through the use of the commercially available Intel port circuit 8255, allows an operator via the microprocessor circuit MP, to initiate a start data point manually via a manual data request input to the OR gate 68.

A control circuit 70 which consists of interconnected flip-flop circuits 72 and 74 and logic gate 76 communicate with the microprocessor circuit MP through the port circuit 72 to inform the microprocessor circuit MP when new data is available at the data section DS. The flip-flop circuit 72 has as an input the data window start signal from OR gate 68 while the flip-flop circuit 74 has as its input the output signal of the window section WS indicative of the data window finish. The output of the interconnected flip-flop circuits 72 and 74 is a new data signal which is transmitted to the port circuit 72 and made available to the microprocessor circuit MP. The microprocessor circuit MP acknowledges the new data signal by transmitting a clear signal through the port circuit 72 and logic gate 76 to clear or reset the flip-flops 72 and 74 of the control circuit 70. Yet another piece of information provided to the microprocessor circuit MP by the port circuit 72 is a data overflow signal from the data section DS. Suitable implementation of the flip-flop circuits 72 and 74 and logic gate 76 can be implemented through the use of the designated commercially available components.

What we claim is:

1. In a nuclear reactor flux mapping system including one or more neutron detectors operable to be driven into and out of the reactor core along any one of a number of pre-established paths in response to a mechanical drive mechanism and drive control circuitry, said detector producing an electrical signal indicative of the neutron activity within the reactor core, the combination of;

a converter means for converting the electrical signal of a detector to a pulse rate indication of the measured neutron activity;

a data collection system including a control means and a programmable timer means having a first and second section, said control means producing an output indicative of the position of said detector within said reactor core, said first section of said programmable timer means having a clock input, a gate input and an output, a reference frequency means being connected to the clock input of said first section, said output of said control means being connected to the gate input of said first section, said first section producing a data window output of a predetermined duration, said second section of said programmable timer means having a clock input and a gate input, said data window output of said first section being supplied as the gate input to said second section, said pulse rate output of said converter means being supplied as the clock input to said second section, said second section producing a measurement of neutron activity within said data window in accordance with the position of the detector within said reactor core, and means connected to said second section to access said neutron activity measurement information.

2. In a system as claimed in claim 1 wherein said converter means is a voltage to frequency converter means, said electrical signal of said detector being a voltage signal, further including an optical isolator circuit means for coupling the pulse rate output of said voltage to frequency converter means to the clock input of said second section of said programmable timer means.

3. In a system as claimed in claim 1 further including an incremental encoder means connected between the detector mechanical drive mechanism and said control means to supply quadrature square waves indicative of the position of said detector, said control means including a quadrature detector circuit means responding to said quadrature square waves by generating up and down pulses corresponding to the direction of movement of the detector and logic means connected between said quadrature detector and the gate input of said first section to establish the window start input indicative of the beginning of said data window.

4. In a system as claimed in claim 1 wherein said reference frequency means is a crystal controlled frequency source.

5. In a system as claimed in claim 1 wherein said control means includes logic circuitry connected to the gate input of said first section to respond to a command by transmitting a window start gate input to initiate said data window.

6. In a system as claimed in claim 1 wherein the second section of said programmable timer means includes a binary counter means, said counter means developing a count value corresponding to the pulse rate clock input from the counter means occurring during the data window established by the first section, said count value being stored as a measurement of the neutron activity measured by the detector at a position in the reactor core determined by said control means.

7. In a system as claimed in claim 6 wherein said means for accessing the neutron activity measurement stored in said binary counter is a microprocessor means.

8. In a system as claimed in claim 6 including interface circuit means coupling said programmable timer means and said microprocessor means, said programmable timer means transmitting a signal indicative of the end of a data window to alert the microprocessor means to the fact that neutron activity measurement information is available in said second section, said microprocessor means transmitting a clear signal to said binary counter means following access of the neutron activity measurement information by the microprocessor means.

9. In a system as claimed in claim 1 wherein the rate at which data windows are generated is a multiple of the period of the power line electrical excitation of the system.

* * * * *